United States Patent
Östrup et al.

(10) Patent No.: US 6,205,336 B1
(45) Date of Patent: Mar. 20, 2001

(54) METHOD AND SYSTEM FOR IMPROVING NETWORK RESOURCE UTILIZATION IN A CELLULAR COMMUNICATION SYSTEM

(75) Inventors: Nils Peter Östrup; Per Johan Schultz; Lars Folke Johansson, all of Linköping; Lars Håkan Palm, Lund, all of (SE)

(73) Assignee: Telefonaktiebolaget LM Ericsson (publ) (SE)

(*) Notice: Subject to any disclaimer, the term of this patent is extended or adjusted under 35 U.S.C. 154(b) by 0 days.

(21) Appl. No.: 09/134,202

(22) Filed: Aug. 14, 1998

(51) Int. Cl.[7] .................................................. H04Q 7/20
(52) U.S. Cl. ..................... 455/444; 455/436; 455/449; 455/450; 455/453; 370/328; 370/331
(58) Field of Search ..................... 455/436, 444, 455/449, 450, 453, 433, 445; 370/328, 329, 331, 352

(56) References Cited

U.S. PATENT DOCUMENTS

| | | | |
|---|---|---|---|
| 5,278,991 | 1/1994 | Ramsdale et al. | 455/33.2 |
| 5,392,453 | 2/1995 | Gudmundson et al. | 455/33.2 |
| 5,432,843 | 7/1995 | Bonta | 379/60 |
| 5,548,806 | 8/1996 | Yamaguchi et al. | 455/33.1 |
| 5,557,657 | 9/1996 | Barnett | 379/60 |
| 5,640,677 | 6/1997 | Karlsson | 455/33.2 |
| 5,729,531 * | 3/1998 | Raith et al. | 370/252 |
| 5,937,353 * | 8/1999 | Fapojuwo | 455/444 |
| 6,002,678 * | 12/1999 | Jayapalan et al. | 370/331 |
| 6,128,287 * | 10/2000 | Freeburg et al. | 370/331 |
| 6,137,783 * | 10/2000 | Sallberg | 370/316 |

FOREIGN PATENT DOCUMENTS 101573   4/1999   (EP).

OTHER PUBLICATIONS

Yi–Bing Lin, Li–Fang Chang, and Anthony Noerpel Bellcore, "Modeling Hierarchical Microcell/Macrocell PCS Architecture", Communications—Gateway to Globalization, Proceedings of the International Conference on Communications, Seattle, Jun. 18–22, 1995, vol. 1, Jun. 18, 1995, pp. 405–409, XP000533019, IEEE.

Gregory P. Pollini, "Trends in Handover Design", IEEE Communications Magazine, vol. 34, No. 3, Mar. 1, 1996, pp. 82–90, XP000557380.

* cited by examiner

*Primary Examiner*—Dwayne Bost
*Assistant Examiner*—Temica M. Davis
(74) *Attorney, Agent, or Firm*—Jenkens & Gilchrist, A Professional Corporation

(57) ABSTRACT

A hierarchically structured cellular network is disclosed. When an active mobile station requests a service that requires the use of a network resource not available in the cell handling the ongoing call (or, alternatively, during call set up), the network checks for cells on the higher levels to determine if the required resource is available. If the resource is available in a higher level cell, the call is handed over to that cell and the resource is allocated to the call. The call can be maintained in the higher level cell until the resource is no longer needed, or a "better" cell capable of providing the required resource is found.

19 Claims, 2 Drawing Sheets

METHOD AND SYSTEM FOR IMPROVING NETWORK RESOURCE UTILIZATION IN A CELLULAR COMMUNICATION SYSTEM

BACKGROUND OF THE INVENTION

1. Technical Field of the Invention

The present invention relates in general to the mobile communications field and, in particular, to a method and system for improving utilization of network resources with handovers in a cellular communication system.

2. Description of Related Art

A hierarchical (layered) cell structure can be used as one approach to obtain higher network capacities in mobile radiotelephone systems. For example, Hierarchical Cell Structures (HCSs) are being used in Personal Digital Cellular (PDC) System radio networks in Japan, so that cells of different sizes can be used to cover the same geographical areas. Using such a hierarchical cell structuring approach, the PDC networks' radio channel frequencies can be re-used to a much greater extent than with conventional cell structures, which results in higher capacity (traffic load). In that regard, a hierarchically structured network can employ a handover procedure to order a mobile station (MS) to move from one radio channel frequency to another in the same cell or a different cell.

A problem that arises with such cell structuring approaches is that certain, special communication resources provided by the radio networks are not necessarily maintained and made available in cells at all levels, especially in those networks where higher capacities are desired. An example of such a resource typically not made available in lower level cells is a full-rate traffic channel, or a circuit-switched data transmission service. In radio networks utilizing a HCS, the operators typically configure the networks to provide these resources in the higher level, broader coverage cells (e.g., layer 3 or "umbrella" cells in a three-layered HCS network). As such, in existing mobile systems, an MS accesses the "best" (e.g., higher carrier-to-interference or carrier-to-adjacent ratio) available cell in the radio network. The network then assigns a traffic channel (TCH) to the MS in a cell on the lowest possible level. Consequently, when an active MS requests a service that requires the use of a specific resource (e.g., full-rate traffic channel, or circuit-switched data transmission service), and if that resource is not available in the cell handling the ongoing call, the requested service will not be provided for that call. Therefore, the network will most likely disconnect that call. However, as described in detail below, the present invention successfully resolves this problem and other related problems.

SUMMARY OF THE INVENTION

In accordance with a preferred embodiment of the present invention, in a HCS network, when an active MS requests a service that requires the use of a network resource not available in the cell handling the ongoing call (or, alternatively, during call set up), the network checks for cells on the higher levels to determine if the required resource is available. If the resource is available in a higher level cell, the "call" is handed over to that cell and the resource is allocated to the call. The call can be maintained in the higher level cell until the resource is no longer needed, or a "better" cell capable of providing the required resource is found.

An important technical advantage of the present invention is that a network operator can create a radio network plan based on the capacities of different communication resources.

Another important technical advantage of the present invention is that network resource utilization is increased significantly over conventional approaches.

Yet another important technical advantage of the present invention is that the flexible resource utilization allows more calls to be set up in the lower layer cells, which allows mobile stations to transmit at lower power levels and thus save battery power.

Still another important technical advantage of the present invention is that the flexible resource utilization that allows more calls to be set up in the lower layer cells, also reduces the total interference level in the network.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
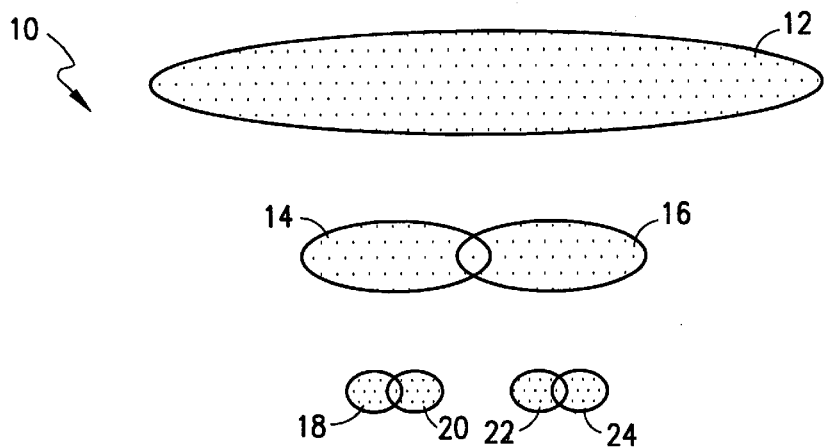
FIG. 1 is a diagram that illustrates an exemplary hierarchical cell structure for a mobile radiotelephone network, which can be used to implement a preferred embodiment of the present invention.
Figure 2:
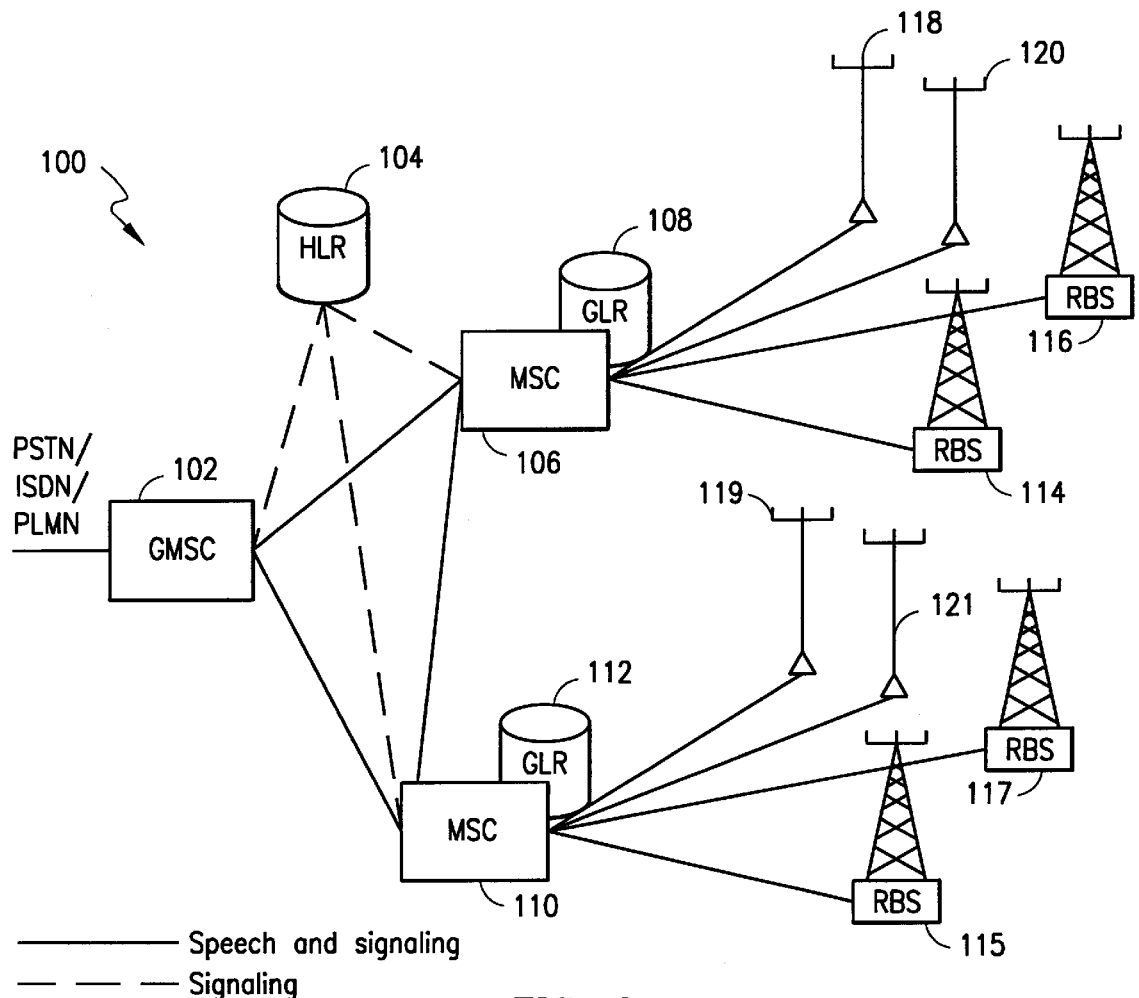
FIG. 2 is a simplified block diagram of an exemplary cellular network that can be used to implement the preferred embodiment of the present invention.
Figure 3:
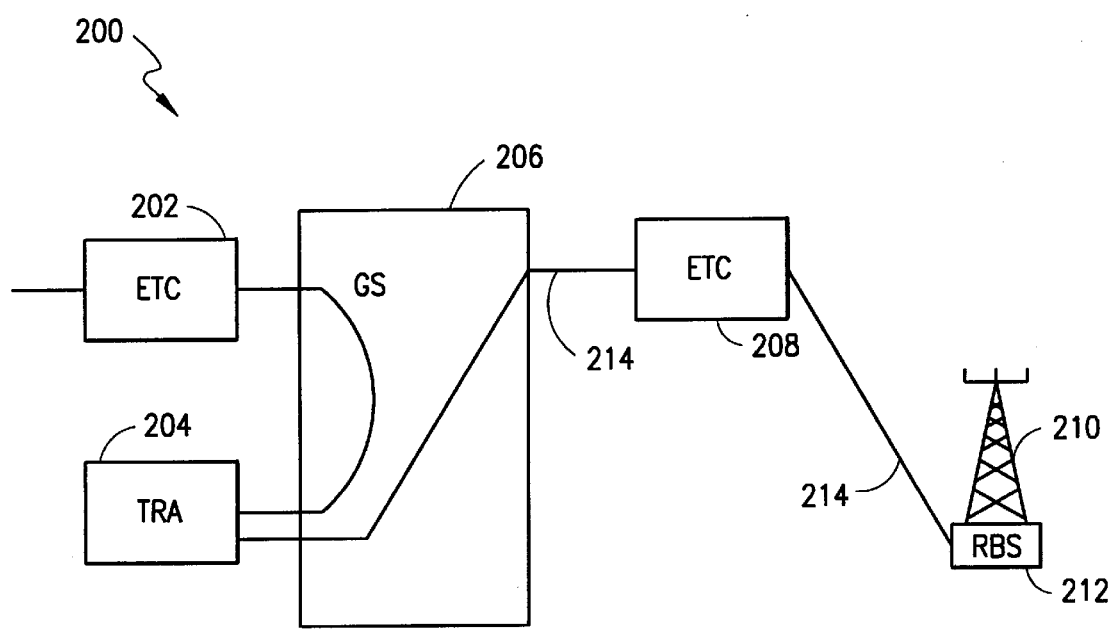
FIG. 3 is a simplified block diagram that illustrates an exemplary mobile base station subsystem that can be associated with one or more mobile services switching centers and radio base stations in the cellular network shown in FIG. 2 to implement the preferred embodiment of the present invention.

The preferred embodiment of the present invention and its advantages are best understood by referring to FIGS. 1–3 of the drawings, like numerals being used for like and corresponding parts of the various drawings.

Essentially, in accordance with a preferred embodiment of the present invention, in a hierarchically structured or layered cellular network, when an active MS requests a service that requires the use of a network resource not available in the cell handling the ongoing call, the network checks for cells on the higher levels to determine if the required resource is available. If the resource is available in a higher level cell, the "call" is handed over to that cell and the resource is allocated to the call. The call can be maintained in the higher level cell until the resource is no longer needed, or a "better" cell capable of providing the required resource is found.

Specifically, FIG. 1 is a diagram that illustrates an exemplary hierarchical cell structure (10) for a mobile radiotelephone network, which can be used to implement a preferred embodiment of the present invention. The exemplary HCS 10 shown represents a three-layer cell structure, with at least one "umbrella" cell 12 at the highest level (e.g., layer 3), a plurality of "normal" cells 14, 16 at the next lower level (e.g., layer 2), and a plurality of "micro" cells 18, 20, 22, 24 at the lowest level (e.g., layer 1) in the hierarchy. Notably, although not explicitly shown, the radio network can include more than one of such "umbrella" cells, along with corresponding sets of "normal" and "micro" cells. Also, the HCS concept described herein can be extended to include one or more additional levels of cells (e.g., so-called "pico" cells and/or "macro" cells)

FIG. 2 is a simplified block diagram of an exemplary cellular network (100) that can be used to implement the preferred embodiment of the present invention. The exemplary network 100 includes a gateway mobile services switching center (GMSC) 102 connected to a home location register 104 and a plurality of MSCs 106, 110. Essentially, the GMSC 102 functions to connect the network 100 to other networks, and is the entry/exit point for calls from/to other networks to/from mobile subscribers. The HLR 104 is a database that contains subscriber information including the current location of the subscribers' MSs in the network. The MSCs 106, 110 in combination with their respective gateway location registers (GLRs) 108, 112 control the routing of calls, location registrations, and handovers. The GLRs 108, 112 are databases that are responsible for storing and updating subscriber information for the MSs located in their respective MSC/GLR coverage areas. The MSCs 106, 110 are connected to a respective plurality of radio base stations (RBSs) 114–121, each of which defines a cell. As described in detail below, certain of the cells defined by the RBSs 114–121 can represent certain of the cells 12–24 shown in FIG. 1. The subscribers' MSs (not shown) are connected to an MSC 106 or 110 via a radio air interface and an RBS 114–121.

FIG. 3 is a simplified block diagram that illustrates an exemplary mobile base station subsystem (MBS) 200 that can be associated with one or more of the MSC/GLRs and RBSs in the cellular network 100 (FIG. 2) to implement the preferred embodiment of the present invention. For example, an MBS (200) associated with the MSC/GLR 106/108 can provide communications resources for certain of the RBSs (e.g., 114, 116) and the cell or cells defined thereby (e.g., "umbrella" cell 12 or "normal" cells 14, 16 in FIG. 1). At this point, it is useful to describe some exemplary communications resources (and associated concepts) that can be provided by the MBS shown.

In the context of a PDC system (but not limited to just this system), the RBSs 114, 116 can include dual rate equipment that provides resources capable of carrying full rate and half rate connections. Such dual rate equipment provides three dual rate channel pairs. As such, the "channel rate" (e.g., full rate or half rate) indicates the channel rate currently in use for a traffic channel. A "dual rate channel pair" denotes the channels on dual rate equipment that together provide a resource capable of carrying one full rate connection or two half rate connections. Such a dual rate channel pair comprises the channels corresponding to the radio air interface time slots TS0/TS3, TS1/TS4, or TS2/TS5.

A "dual rate traffic channel" denotes a traffic channel included in a dual rate channel pair, which is capable of carrying a half rate connection. Together with the other channel in the dual rate channel pair, the dual rate traffic channel is capable of carrying a full rate connection. A full rate traffic channel represents a traffic channel carrying a full rate connection. In the PDC radio air interface, for example, a full rate traffic channel corresponds to one full rate time slot, TS0–TS2. One full rate time slot corresponds to two half rate time slots. A half rate traffic channel represents a traffic channel carrying a half rate connection. In the PDC radio air interface, for example, a half rate traffic channel corresponds to one half rate time slot, TS0–TS5.

Returning to FIG. 3, the exemplary MBS 200 includes a plurality of exchange terminal circuits (ETCs) 202, 208, which function as trunk interfaces (e.g., bit rate adapters) between the group switch 206 and other networks and transceiver (TRX) 212 in the RBS 210. The group switch 206 can switch the calls in order to include or exclude the transcoder rate adaptor (TRA) 204 in or out of the connection. The TRA-TRX link 214 is a connection between the TRA 204 and TRX 212, which can carry a plurality of full, half, or dual rate speech channels.

In this embodiment, the traffic functions in the MBS 200 handle the radio channel connections in this part of the network 100, which includes, for example, controlling certain physical channels, handling all logical channels, and controlling the RBS 210 and TRA 204 in the MSC (106). The TRA 204 performs a rate conversion from the 64 kbps Pulse Code Modulation (PCM) links used in the group switch 206 and trunk lines to the rates used in the speech connections. As such, the group switch 206 can switch the TRA 204 into the connection if a rate conversion is needed.

Depending on the traffic, the TRA 204 can operate in a number of different modes. In one mode, the TRA 204 converts 11.2 kbps Vector-Sum Excited Linear Prediction (VSELP) encoded speech data (speech connection for the network MSs involved) into a 64 kbps $\mu$-law PCM coded speech signal. This mode is used when the network MS is connected to any terminal other than another network MS. In a second mode of operation, if there is a call from one network MS to another network MS, the TRA 204 does not convert the signal from the MS, but transports the 11.2 kbps VSELP encoded speech signal to the network using a 64 kbps unrestricted digital channel. This mode is valid only for full rate channels in the PDC, and is used to eliminate the potential for encoding/decoding the speech data twice, which could have occurred because of the MS-to-MS call. In a third mode of operation, the TRA 204 can operate in a non-speech data mode (e.g., circuit-switched data transmission service mode). In the PDC, this mode is valid only for full rate channels.

For this example, it can be assumed that the lower layer cells (e.g., 14, 16) in the network 10 can provide multiplexing for each TRX used. As such, in the PDC, two TRA-TRX links 214 in each of these cells can be multiplexed into one 64 kbps time slot. Consequently, given this resource limitation, only one circuit-switched data transmission service call per TRX (e.g., 212) can be set up in each of these cells. In other words, the capacity for carrying circuit-switched data transmission service calls is relatively low in the lower layer cells.

On the other hand, for this PDC example, it can be assumed that no multiplexing is provided for the TRXs (212') in the higher layer cells (e.g., 12) in the network.

Consequently, given the absence of this resource limitation, all three of the time slots used by each TRX (212') can carry circuit-switched data transmission service calls. In other words, the capacity for carrying circuit-switched data transmission service calls is relatively high in the higher layer cells (e.g., 12).

More specifically with respect to the network exemplified by FIGS. 1–3, assume that each RBS 210' (or, for example, 114, 116) that defines the higher layer cells (e.g., 12) includes 10 TRXs, with each TRX capable of handling 3–6 speech channels or 1–3 non-speech (data) channels. Also, each RBS 210 (or, for example, 118, 120) that defines the lower layer cells (e.g., 14, 16) includes 2 TRXs, with each such TRX capable of handling 3–6 speech channels or 1–3 non-speech channels. Under this scenario, if the lower layer cells (e.g., 14, 16) are using multiplexing on the respective TRA-TRX links (e.g., 214), then each of these lower layer cells can set up only two non-speech calls.

In a conventional network, if there were two such ongoing calls in one of these lower layer cells, and a third call were to request a circuit-switched data transmission service in that cell, then the network would refuse to provide the circuit-switched data transmission service resource for that call. Ultimately, the network likely would disconnect that call. However, in accordance with the preferred embodiment of the present invention, the network 10/100 determines whether the higher layer cell (12) has channels available (e.g., not in use) that can carry the requested circuit-switched data transmission service, and performs a conventional inter-cell handover for that MS and call, from the lower layer cell to an appropriate channel in the higher layer cell. The MSC/GLR (106/108) stores pertinent information about which resources are available in which cells, and controls the inter-cell handover procedure. The requested circuit-switched data transmission service is then provided for that call by the resource in the higher layer cell. Notably, although the exemplary embodiment described above deals with a hierarchical relationship between cells 12 and 14, 16, the invention is not intended to be so limited. For example, the hierarchical relationship and inter-cell handover can be between one of the lower layer cells 18, 20, 22, 24 and one of the higher layer cells 14, 16. In summary, if a service/resource is not provided by one (layer) cell, but can be provided by another (layer) cell, then (in accordance with the present invention) the network can hand over the MS making the call (and requesting the service) to a cell in the layer capable of handling that service and call. The network can maintain the call in the cell capable of handling that service, until the call is disconnected, the "special" resource is no longer required for that call, or a "better" cell with appropriate resources that can provide the service is found. In the last case, the network MSC can then institute a hand over to transfer the call to the "better" cell.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for utilizing communication resources in a layered cellular network, wherein a mobile station is not at the edge of a cell comprising the steps of:
   invoking a circuit-switched data transmission service associated with a communication resource during a call in a first layer cell;
   determining whether said communication resource is available during said call in said first layer cell;
   if said communication resource is not available during said call in said first layer cell, determining whether said communication resource is available during said call in a second layer cell;
   if said communication resource is available during said call in said second layer cell, handing off said call from said first layer cell to said second layer cell.

2. The method of claim 1, wherein said call comprises a call set up procedure.

3. The method of claim 1, wherein said first layer cell is a lower level cell than said second layer cell.

4. The method of claim 1, wherein said layered cellular network comprises a hierarchical cell structure.

5. The method of claim 1, wherein said layered cellular network comprises a layered PDC network.

6. The method of claim 1, wherein said communication resource comprises a full rate traffic channel.

7. The method of claim 1, wherein said first layer cell comprises a normal cell.

8. The method of claim 1, wherein said first layer cell comprises a micro-cell.

9. The method of claim 1, further comprising the steps of:
   determining whether said communication resource is available during said call in another cell; and
   if said communication resource is available during said call in said another cell, handing off said call from said second layer cell to said another cell.

10. A multi-layered cellular network, wherein a mobile station is not at the edge of a cell, comprising:
    a first base station defining a first layer cell in said cellular network; and
    a second base station defining a second layer cell in said cellular network, said cellular network further comprising:
    means for invoking a non-speech related service associated with a communication resource during a call in said first layer cell;
    determining whether said communication resource is available during said call in said first layer cell;
    if said communication resource is not available during said call in said first layer cell, determining whether said communication resource is available during said call in a second layer cell;
    if said communication resource is available during said call in said second layer cell, handing off said call from said first layer cell to said second layer cell.

11. The multi-layered cellular network of claim 10, wherein said call comprises a call set up procedure.

12. The multi-layered cellular network of claim 10, wherein said first layer cell is a lower level cell than said second layer cell.

13. The multi-layered cellular network of claim 10, wherein said layered cellular network comprises a hierarchical cell structure.

14. The multi-layered cellular network of claim 10, wherein said layered cellular network comprises a layered PDC network.

15. The multi-layered cellular network of claim 10, wherein said communication resource comprises a full rate traffic channel.

16. The multi-layered cellular network of claim 15, wherein said service comprises a data service.

17. The multi-layered cellular network of claim 15, wherein said service comprises a circuit-switched data transmission service.

18. The multi-layered cellular network of claim 10, wherein said first layer cell comprises a normal cell.

19. The multi-layered cellular network of claim 10, wherein said first layer cell comprises a micro-cell.

* * * * *